United States Patent [19]

Whiteman

[11] Patent Number: 4,673,925
[45] Date of Patent: Jun. 16, 1987

[54] BOILING ALARM

[76] Inventor: Gary D. Whiteman, 284 E. Protrero Rd., Thousand Oaks, Calif. 91361

[21] Appl. No.: 665,184

[22] Filed: Oct. 26, 1984

[51] Int. Cl.$^4$ ............................................. G08B 21/00
[52] U.S. Cl. ................................ 340/603; 200/61.05; 340/620
[58] Field of Search ............... 340/602, 603, 622, 595, 340/620; 916/216; 200/61.04, 61.05, 61.06, 215; 73/336.5

[56] References Cited

U.S. PATENT DOCUMENTS

| 957,663 | 5/1910 | Emslie | 116/70 |
| 2,049,321 | 7/1936 | Sampson | 200/61.04 |
| 3,123,812 | 3/1964 | Woodling | 340/602 |

OTHER PUBLICATIONS

*Practical Electronics,* vol. 15, No. 1, Jan. 1979, p. 31, Wilds, R. et al., "Kettle Whistle".
*Practical Electronics,* vol. 18, No. 3, Mar. 1982, p. 33, "Liquid Alarm".
*Electronics,* vol. 41, No. 6, Sep. 1979, pp. 96–101, Cohn, G., "Versatile Moisture & Light Detector.

*Primary Examiner*—James L. Rowland
*Assistant Examiner*—Jeffery A. Hofsass
*Attorney, Agent, or Firm*—Koppel & Harris

[57] ABSTRACT

A boiling sensor includes a case, which is mounted on the upper edge of a container in which liquid is to boil. A pair of electrical probes are spaced apart a small distance and mounted on the case above the liquid. Behind the probes is a collector of the material, preferably sheet nylon, which does not absorb the liquid, which is non-wettable and electrical insulative, and which has a high heat capacity. With a high heat capacity, the vapor raises the temperature of the collector slowly so that vapor continues to condense on the collector between the probes. The probes are part of an electrical circuit. The condensed water vapor allows current to flow the between the probes, and the rest of the circuit causes current to flow through a sound or visual indicator to indicate that the water is boiling. This circuit also has a voltage divider, one side of which is the electrical probe, and by adjusting the resistance on the other side of the voltage divider, the sensitivity of the circuit can be controlled. In another embodiment the probes are a metal plate and a screw which extends into the case but which is electrically insulated by a nylon bushing. The bushing acts as the vapor collector.

9 Claims, 5 Drawing Figures

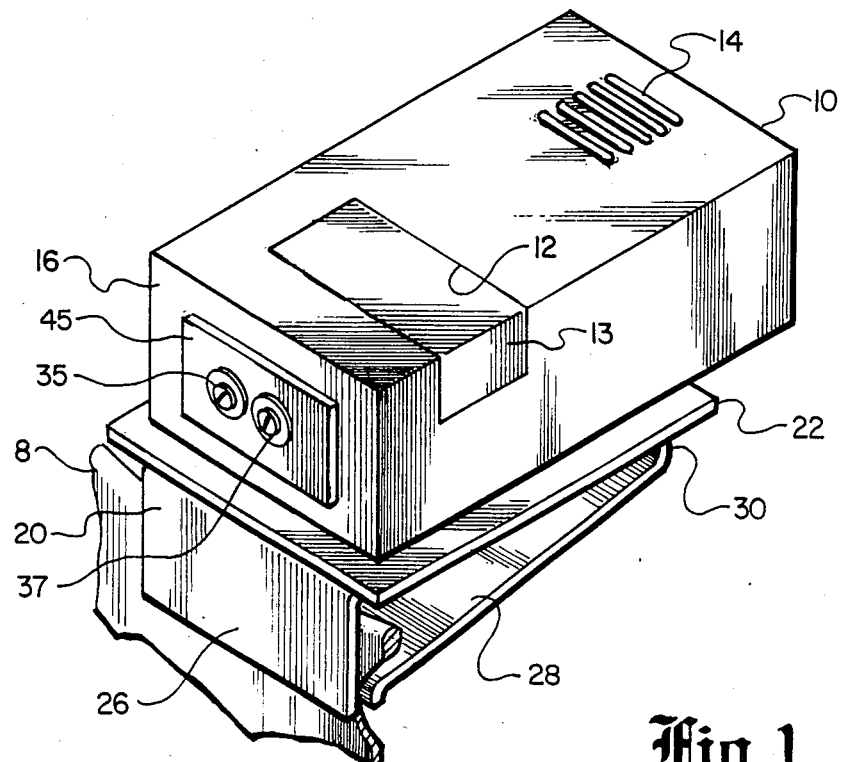
Fig.1.
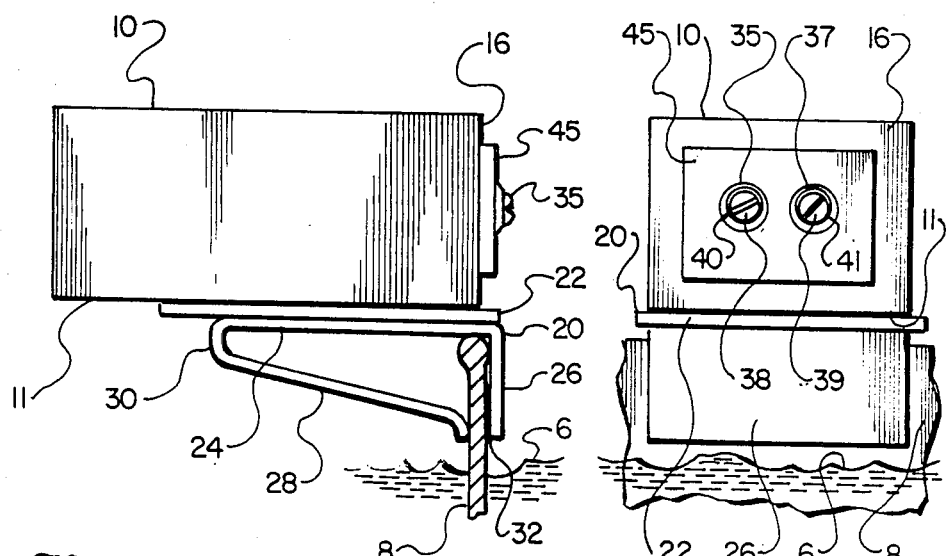
Fig.2.
Fig.3.

BOILING ALARM

BACKGROUND OF THE INVENTION

1. Field of the Invention

The present invention is an electronic boiling sensor attachable to a pot above the water which audibly or visually indicates that the water in the pot is boiling.

2. Background of the Prior Art

There are a number of ways of sensing boiling other than merely making continuous checks on the condition of water in a pot being heated. It is desirable to known when liquid is boiling because many cooking procedures being when the water being used begins to boil. When water is first placed in a pot and heated for boiling, it is difficult to gauge accurately when boiling will start because the amount of water, its initial temperature, the conductivity of the pot and the heat quantity to the pot vary. Time is wasted continually checking on the liquid to see if boiling has begun, and continued heating beyond boiled without actual cooking wastes energy. On the other hand, some liquid should not be heated to boiling or should not boil too vigorously. Certain foods spill over, overcook or are burned by too vigorous heating.

There are a number of previous devices for testing whether water is boiling. One common way is to pass the collected steam through a whistle. This is a common means in tea kettles. A whistle incorporated in a pot or pan cover is disclosed in Emslie, U.S. Pat. No. 957,633 (1910). One may not want to use a cover, however, and such a system would require a separate cover with a whistle for each different sized pot.

Boiling can also be sensed by a temperature probe. It is not desirable to place the probe in the liquid itself because the device will have to be cleaned. Simple thermometers must be read, and reading a thermometer offers no advantage over merely checking the liquid visually to see if it is boiling. Electric temperature sensors that would yield audible or visual signal when a certain liquid temperature is reached might be perceived as potential sources of contamination of the liquid and still require cleaning. Moreover the boiling temperature varies greatly. Temperature sensing of the vapor is also inaccurate because the vapor temperature also fluctuates. One frequently finds that the temperature of the vapor decreases after the liquid starts boiling.

SUMMARY OF THE INVENTION

It is an object of the present invention to alleviate the problems of the prior art. The principal object is to disclose and provide a sensor that can accurately determine when boiling begins and which can be attached to any pot and does not have to be inserted into the liquid.

These objects are met by the present invention which includes a case that is mounted to the lip of the pot above the liquid. A pair of electrical probes are on the outside of the case and are spaced apart a small distance from each other. The probes are mounted on collector means that extend between the probes for collecting condensed vapor thereon. The collector means is of a material that does not absorb the liquid and has a heat capacity greater than the heat capacity of the electrical probe so that the vapor raises the temperature of the collector means slowly allowing vapor to continue condensing on the collector means. The electrical probes are part of a circuit which also includes a source of current and an indicator. The electrical probes act as a normally open switch preventing current from flowing through the indicator. Condensed water vapor on the collector allows current to pass through the electrical probes and the indicator turning on the indicator. The preferred collector means is a sheet of nylon. The electrical probes are attached to the case through the nylon. Nylon does not absorb water, and it increases in temperature more slowly than the metal, electrical probes. When the water boils releasing vapor, the vapor condenses on the nylon between the two probes closing the circuit.

BRIEF DESCRIPTION OF THE DRAWINGS

FIG. 1 is a perspective view of the boiling sensor of the present invention attached to a pot.

FIG. 2 is a side elevation of the boiling sensor of the present invention.

FIG. 3 is a front elevation of the boiling sensor.

DETAILED DESCRIPTION OF THE PREFERRED EMBODIMENT

Figure 4:
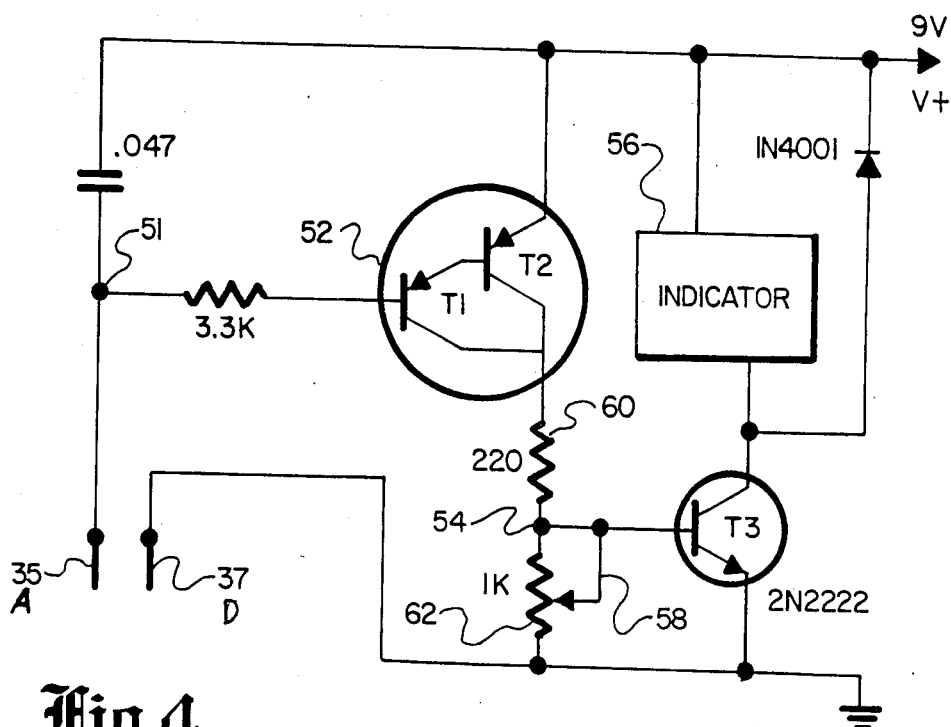
FIG. 4 is a diagram of the circuit used in the boiling sensor of the present invention.

Turning first to FIGS. 1 through 3, the boiling sensor of the first embodiment the present invention is shown. The circuitry and power supply is housed in case 10. The case in the exemplary embodiment is in the shape of a rectangular prism and is formed of a hard plastic. For decorative reasons, the shape of case 10 may be modified to be more in keeping with the kitchen setting in which it will be used.

Mounting means in the form of clip 20 is fastened to the bottom wall 11 of case 10. In the exemplary embodiment, a sheet of insulating plastic 22 is fixed to bottom wall 11 and clip 20 is secured to bottom wall 11 through the insulating sheet 22. Sheet 22 slows the transfer of heat to case 11 and guards the electric components from heat damage. Clip 20 is formed of stainless steel or other non-corrosive material and bent into the shape shown in FIGS. 1 through 3. The clip has an upper wall 24, which is flat to conform with flat sheet 22 and bottom wall 11. A short front wall 26 depends from the front end of upper wall, and a diagonal arm 28 extends from curved portion 30 at the rear of bottom wall 24 toward the bottom of front wall 26 leaving a space 32. As FIG. 2 shows, the side wall 8 of a pot or pan fits into opening 32, and clip then supports the sensor in the positions shown in FIGS. 1 through 3.

Case 10 in the exemplary embodiment is approximately $1 \times 3 \times 1.5$ inches ($2.5 \times 7.4 \times 3.7$ cm). It includes a small opening 12 closed by cover 13 for access to one or more batteries. Element 14 (FIG. 1) is an opening for the indicator, either a buzzer or bell or a lamp or other light emitting device. Sound emitting or light emitting devices can be concealed as desired, or they can be attached as separate units to the outside of case 10.

In order to sense the presence of vapor, a pair of electrical probes are spaced apart a small distance and mounted on the case above the liquid. In the first exemplary embodiment, the electrical probes 35 and 37 are mounted to the front wall 16 of case 10. Each electrical probe is a stainless steel machine screw 38, 39 and a stainless steel washer 40, 41. The distance between the stainless steel washers is important because this distance determines the sensitivity of the circuit involved (as further explained). In the first exemplary embodiment, the distance is 0.035 inches (0.89 mm).

Between probes 35 and 37 and front wall 16 of case 10 is collector means in the form of sheet nylon. During fabrication, sheet 45 of the collector means could be incorporated into front wall 16; it is a separate element in this embodiment. When water 6 in pot 8 boils, vapor rises. Some of it will condense on collector 45 between probes 35 and 37 thereby creating a path of electricity between the two probes and energizing the indicator in the circuit that will be described below. The material chosen for collector means 45 should not absorb the condensed liquid because the absorbed water would tend to close the gap between the electrical probe 35 and 37 even after the sensor was removed from the pot, and it would also affect subsequent readings. The material also should be non-wettable to water. Certain metals, for example, are wetted by water. The water does not "bead". Water beads on many plastics and on waxed metals. These materials are non-wettable.

Of course, the material must electrically insulative, and it should have a heat capacity substantially greater than the heat capacity of the electrical probe. Nylon has a heat capacity of about 0.4 cal/g °C. whereas that of Aluminum is about 0.2 cal/g °C. and that of iron is 0.1 cal/g °C. The material in part is defined in terms of heat capacity because it is desirable that the material increase in temperature slowly when exposed to the warm seam or water vapor will not condense on collector 45, and there will be no electrical path between the two probes 35 and 37.

Through experimentation, the best material used was sheet nylon approximately ⅜ inch (3 mm) thick. In this exemplary embodiment, machine screws 38 and 39 of probes 35 and 37 pass through the sheet of nylon, and the screws and washers 40 and 41 secure it to the front wall 16 of case 10. An adhesive may also be provided for additional securing.

Figure 5:
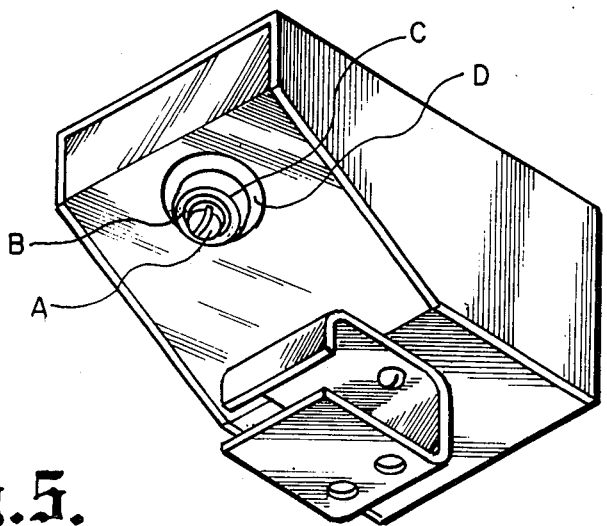
FIG. 5 is a bottom perspective view of a second embodiment of this invention.

In a modified embodiment (FIG. 5) the two screws, which are the probes, and nylon sheet are replaced by a single screw and a metal plate, which are the probes, and a nylon bushing. In FIG. 5, stainless stub screw A extends through nylon bushing C to be secured to but electrically insulated from stainless steel plate D on the underside of the device. A metal washer B may also be provided. Bushing C is approximately 0.16 in (3.8 mm) high (vertical distance along the slanted side of the bushing). Bushing C is also of a wider diameter than the screw A and may be inset slightly. In this exemplary embodiment, the diameter of the screw (with any washer) is about 0.38 in (9.2 mm); the diameter of the bushing at its top surface is about 0.25 in (6.1 mm).

The circuit that controls the boiling sensor is shown in FIG. 4. Voltage is obtained in the exemplary embodiment from a 9 V battery. When there is no water vapor between probes 35 and 37 (or probes A and D), points 51 and 52 are at a high voltage holding PNP transistor T1 open. The base of PNP transistor T2 is also at a high voltage keeping transistor T2 open. Because no current flows through transistor T2, node 54 is at ground potential which holds NPN transistor T3 open. No current, therefore, flows through indicator 56. The condensed water vapor between probes 35 and 37 (or A and D) has a resistance. Another resistor 58 is also provided to act as a voltage divider with the resistance of the water vapor. As the amount of vapor condensed on collector 45 increases, resistance between probes 35 and 37 (or A and D) decreases, which lowers the voltage at points 51 and 52. When that voltage drops below a threshold voltage because of current flow between probes 35 and 37 (or A and D), transistor T1 closes causing transistor T2 to act like a diode. Current then flows through a 220 ohm resistor 60 and a 1 K ohm resistor 62 creating a positive voltage at node 54 and at the base of transistor T3. Transister T3 then turns on, allowing current to flow through indicator 56. Indicator 56 can either be a light or a buzzer or bell. The sound-type indicators are preferable because they can note boiling without visual indications.

The sensitivity of the circuit of FIG. 4 can be adjusted by changing the resistance of resistor 58. In the exemplary embodiment, a one megaohm resistor is used. Decreasing the resistance makes the circuit more sensitive.

After boiling begins, the sensor is easily removed from the pot. Without the presence of water vapor, no current will flow between probes 35 and 37 (or A and D) stopping the flow of current through indicator 56. If the indicator continues on, it indicates that there isstill liquid condensed between the probes, which can be removed by wiping with a towel.

The condition of the battery is easily tested by touching both probes 35 and 37 simultaneously with ones finger or any conductor. In the second embodiment, it is only necessary to touch screw A and any part of the case because plate D is grounded to the case. The normal resistance of one's skin between the two probes is sufficient to conduct enough current to activate indicator 56.

Various modifications and changes may be made in the configuration described above that come within the spirit of the invention. The invention embraces all such changes and modifications coming with the scope of the appended claims.

I claim:
1. A sensor for indicating when a liquid in a container begins to boil comprising:
 (a) a case for housing the sensor;
 (b) mounting means on the case attachable to the container for attaching the case above the liquid;
 (c) a pair of electrical probes spaced apart a small distance and mounted on the case above the liquid;
 (d) collector means in the form of a sheet of nylon between the electrical probes for collecting condensed vapor of the liquid thereon, the collector means being of a material which does not absorb the liquid, which is electrically insulative, and which has a heat capacity substantially greater than the heat capacity of the electrical probe whereby the vapor of the boiled liquid raises the temperature of the collector means slowly so that vapor can condense on the collector means between the electrical probes; and
 (e) circuit means comprising a source of current, an indicator and the eletrical probes, the electrical probes extending through the sheet of nylon into the case for holding the sheet of nylon on the case, the electrical probes acting as a normally open switch preventing current flowing through the indicator, the water-vapor on the collector means allowing current to pass between the electrical probes whereby the indicator signals that the liquid is boiling.

2. A sensor for indicating when a liquid in a container begins to boil comprising:
 (a) a case for housing the sensor;

(b) mounting means on the case attachable to the container for attaching the case above the liquid;

(c) a pair of electrical probes spaced apart a small distance and mounted on the case above the liquid;

(d) collector means between the electrical probes for collecting condensed vapor of the liquid thereon, the collector means being of a material which does not absorb the liquid, which is electrically insulative, and which has a heat capacity substantially greater than the heat capacity of the electrical probe whereby the vapor of the boiled liquid raises the temperature of the collector means slowly so that vapor can condense on the collector means between the electrical probes; and (e) circuit means comprising a source of current, an indicator and the electrical probes, the electrical probes acting as a normally open switch preventing current flowing through the indicator, the water vapor on the collector means allowing current to pass between the electrical probes whereby the indicator signals that the liquid is boiling, and wherein the case has a bottom wall, the mounting means having opening means for being attachable to the upper potion of the container, the circuit means being within the case, and thermal insulation means between the mounting means and the circuit means for protecting the circuit means from heat from the boiling liquid, its vapor or the container.

3. The sensor of claim 2 wherein the thermal insulator is mounted between the mounting means and the bottom wall of the case.

4. A sensor for indicating when a liquid in a container begins to boil comprising:

(a) a case for housing the sensor;

(b) mounting means on the case attachable to the container for attaching the case above the liquid;

(c) a pair of electrical probes spaced apart a small distance and mounted on the case above the liquid;

(d) collector means in the form of a sheet of nylon between the electrical probes for collecting condensed vapor of the liquid thereon, the collector means being of a non-wettable material, which is electrically insulative, whereby the vapor of the boiled liquid raises the temperature of the collector means slowly so that vapor can condense on the collector means between the electrical probes; and (e) circuit means comprising a source of current, an indicator and the electrical probes, the electrical probe extending through the sheet of nylon into the case for holding the nylon sheet on the case, the electrical probes acting as a normally open switch preventing current flowing through the indicator, the water vapor on the collector means allowing current to pass between the electrical probes whereby the indicator signalling that the liquid is boiling.

5. The sensor of claim 4 wherein the case has a bottom wall, the mounting means having opening means for being attachable to the upper portion of the container, the circuit means being within the case, and thermal insulation means between the mounting means and the circuit means for protecting the circuit means from heat from the boiling liquid, its vapor or the container.

6. The sensor of claim 5 wherein the thermal insulator is mounted between the mounting means and the bottom wall of the case.

7. The sensor of claim 6 wherein one of the electrical probes extends through the nylon bushing into the case for holding the bushing to the case, the other probe being a plate, which supports the bushing.

8. A sensor for indicating when a liquid in a container begins to boil comprising:

(a) a case for housing the sensor;

(b) mounting means on the case attachable to the container for attaching the case above the liquid;

(c) a pair of electrical probes spaced apart a small distance and mounted on the case above the liquid;

(d) collector means in the form of a nylon bushing between the electrical probes for collecting condensed vapor of the liquid thereon, the collector means being of a non-wettable material, which is electrically insulative, whereby the vapor of the boiled liquid raises the temperature of the collector means slowly so that vapor can condense on the collector means between the electrical probes; and (e) circuit means comprising a source of current, an indicator and the electrical probes, the electrical probes acting as a normally open switch preventing current flowing through the indicator, the water vapor on the collector means allowing current to pass between the electrical probes whereby the indicator signalling that the liquid is boiling.

9. The sensor of claim 8 wherein one of the electrical probes extends through the nylon bushing into the case for holding the bushing to the case, the other probe being a plate, which supports the bushing.

* * * * *